(12) United States Patent
Lau et al.

(10) Patent No.: US 8,186,423 B2
(45) Date of Patent: May 29, 2012

(54) APPARATUS FOR COOLING A HOT GAS

(75) Inventors: TeckSoon Lau, CM Amsterdam (NL);
Tycho Agien Van Der Plas, CM Amsterdam (NL); Edwin Bernardus Wilhelmus Gerardus Voeten, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 1318 days.

(21) Appl. No.: 11/597,444

(22) PCT Filed: May 3, 2005

(86) PCT No.: PCT/EP2005/052023
§ 371 (c)(1),
(2), (4) Date: Nov. 22, 2006

(87) PCT Pub. No.: WO2005/116560
PCT Pub. Date: Dec. 8, 2005

(65) Prior Publication Data
US 2009/0236084 A1    Sep. 24, 2009

(30) Foreign Application Priority Data
May 25, 2004    (EP) .................................. 04102286

(51) Int. Cl.
*F28F 19/00* (2006.01)
*B05B 15/00* (2006.01)

(52) U.S. Cl. .................. 165/134.1; 165/135; 165/142; 165/155; 165/156; 239/132.3; 431/186; 431/187; 431/190; 122/7 R; 122/15.1; 122/18.1; 122/31.1; 122/460

(58) Field of Classification Search ............... 165/134.1, 165/135, 142, 155, 156; 122/7 R, 15.1, 18.1, 122/31.1, 460; 239/132.3; 431/186, 187, 190
See application file for complete search history.

(56) References Cited

U.S. PATENT DOCUMENTS

| | | | | |
|---|---|---|---|---|
| 3,133,731 A | * | 5/1964 | Reed | 431/187 |
| 3,342,242 A | * | 9/1967 | Verloop | 431/186 |
| 3,356,135 A | * | 12/1967 | Sayre | 165/159 |
| 3,610,329 A | | 10/1971 | Markert et al. | 165/142 |
| 3,809,523 A | * | 5/1974 | Varekamp | 431/190 |
| 4,029,054 A | * | 6/1977 | Schuurman | 122/7 R |
| 4,245,696 A | | 1/1981 | Van der Lelij | 165/134 R |
| 4,445,463 A | * | 5/1984 | Casper et al. | 122/7 R |
| 4,666,397 A | * | 5/1987 | Wenning et al. | 239/132.3 |

(Continued)

FOREIGN PATENT DOCUMENTS
EP    290812    11/1988
(Continued)

*Primary Examiner* — Ljiljana Ciric

(57) ABSTRACT

An apparatus for cooling a hot gaseous medium includes a vessel, wherein a bundle of pipes is disposed in a coolant compartment, and wherein a liquid coolant flows around the bundle. The pipes are mounted near upstream ends in a thermal shield and extend through openings in a support plate mounted at a distance from the thermal shield defining a front space between the thermal shield and the support plate in the vessel separated from the coolant compartment. The apparatus permits addition of liquid coolant to the front space. The openings in the support plate are larger than the pipes, defining an annular space. Liquid coolant flows co-current with the hot gaseous medium in the pipes from the front space to the coolant compartment. A skirt type extension surrounds the pipe in the front space to the support plate and having an opening at the thermal shield.

7 Claims, 3 Drawing Sheets

U.S. PATENT DOCUMENTS

| | | | | |
|---|---|---|---|---|
| 4,736,693 A | * | 4/1988 | Clomburg, Jr. | 239/132.3 |
| 4,770,239 A | * | 9/1988 | Duponteil | 165/134.1 |
| 4,848,449 A | * | 7/1989 | Brucher et al. | 165/160 |
| 4,858,538 A | * | 8/1989 | Kuypers et al. | 239/132.3 |
| 5,671,807 A | | 9/1997 | Lameris | 165/134.1 |
| 5,813,453 A | * | 9/1998 | Brucher | 165/134.1 |
| 5,816,322 A | * | 10/1998 | Albano et al. | 165/173 |
| 6,880,492 B2 | * | 4/2005 | Gottschalk et al. | 122/7 R |
| 7,270,539 B1 | * | 9/2007 | Sujata | 431/190 |
| 7,273,366 B1 | * | 9/2007 | Sujata | 431/190 |
| 7,296,542 B2 | * | 11/2007 | Schotz | 122/7 R |
| 7,552,701 B2 | * | 6/2009 | Brinkmann et al. | 122/31.1 |
| 7,610,951 B2 | * | 11/2009 | Friese et al. | 165/108 |
| 7,628,121 B2 | * | 12/2009 | Herwig et al. | 122/31.1 |
| 8,074,610 B2 | * | 12/2011 | Kim et al. | 122/15.1 |
| 8,074,707 B2 | * | 12/2011 | Strack et al. | 165/134.1 |
| 2001/0040024 A1 | * | 11/2001 | Blanda et al. | 165/134.1 |
| 2008/0149316 A1 | * | 6/2008 | Friese et al. | 165/163 |

FOREIGN PATENT DOCUMENTS

| | | |
|---|---|---|
| EP | 774103 | 5/1997 |
| WO | 96/01403 | 1/1996 |
| WO | 2005/015105 | 2/2005 |

* cited by examiner

APPARATUS FOR COOLING A HOT GAS

The present application claims priority of European Patent Application No. 04102286.4.1 filed 25 May 2004.

FIELD OF THE INVENTION

The invention is directed to an apparatus for cooling a hot gaseous medium by indirect heat exchange with a liquid coolant medium.

BACKGROUND OF THE INVENTION

Such heat exchange devices are used on a large scale in many branches of industry, e.g. in the petroleum industry for cooling products obtained from hydrocrackers and reactors for partial oxidation of (hydro)carbon-containing fuels such as natural gas, oil, coal and the like.

Typically the heat exchange takes place by passing the hot gasses through a pipe and contacting the exterior of the pipe with the coolant medium. If the coolant medium is water steam can advantageously be produced as a by-product of the heat exchange process in the apparatus.

When for cooling purposes the hot gases are passed through tubes which are cooled with a cooling medium on the outside, the walls of the tubes acquire a high temperature owing to transfer of heat from the hot gases to the tube metal which heat is further transmitted to the cooling medium.

An example of a hot gaseous medium to be cooled is the hot synthesis gas produced by partial oxidation of (hydro)carbon-containing fuel is generally cooled in a heat exchanger located next to the gasifier thereby producing high pressure steam. A critical area is the gas inlet of the heat exchanger where the hot synthesis gas enters the pipes of the heat exchanger apparatus. The wall thickness of the inlet area is to be minimised but should be thick enough to ensure mechanical integrity based on pressure and thermal loads. The gas velocity at the inlet area should be sufficiently high to prevent fouling (say 12 m/s) but on the other hand low enough to ensure sufficiently low gasside heat transfer coefficients. In particular, obtaining an optimum between fouling and velocity is desirable.

U.S. Pat. No. 3,610,329 describes a heat exchanger for cooling the hot gasses from a gasification process. The vertical oriented inlet section is protected against excessive heat by bricks located between the support plate and the space from where the hot gas flows. The tubes through which the hot gas flows transverse through the bricks. In an embodiment of U.S. Pat. No. 3,610,329 as shown in FIG. 4 the inlet section of the tubes is cooled by using a coolant having a low temperature. The used coolant is discharged from the inlet section by means of a separate conduit. A disadvantage of this design is the use of the bricks which in use can fall down.

An improved design, not having to make use of bricks, is described in U.S. Pat. No. 5,671,807 and U.S. Pat. No. 4,245,696. These publications describe an inlet section of such a heat exchange apparatus wherein the pipes are mounted at their upstream ends in an additional tube plate, also referred to in this description as a thermal shield, and a support plate. Between the thermal shield and the support plate a space is present to which coolant medium is added. This coolant medium will cool the thermal shield and the exterior of the pipes and is discharged from said space via an annular space surrounding the pipes when they pass the support plate. In said annular space the coolant medium flows co-current with the hot gas flowing in the pipes.

EP-A-290812 describes a heat exchanger vessel having an inlet section wherein the pipes are mounted at their upstream ends in a support plate. The coolant used to cool the inlet section is subsequently passed along the downstream end of the tubes via a second tube surrounding the entire length of the tubes. These jacket type of external tubes have openings to allow coolant to be discharged into the space surrounding the tubes and be discharged from the vessel via a single outlet opening.

EP-A-774103 describes an apparatus having an inlet section wherein the pipes are mounted at their upstream ends in a thermal shield and a support plate. Between the thermal shield and the support plate a space is present. As in the above references an annular space is present around the pipes as they pass the support plate. To said annular space coolant medium is added such that it passes the support plate in a direction counter-current to the hot gas flowing in the pipes. Additionally a skirt is present to guide the coolant medium along the exterior of the pipes into the space between thermal shield and support plate. The coolant is discharged at a position near the thermal shield and discharged via openings in the support plate to the main coolant compartment.

A disadvantage of the above prior art apparatuses is that the cooling of the upstream end of the pipes and the thermal shield is not sufficient. The present invention involves a design that aims to overcome said disadvantage.

SUMMARY OF THE INVENTION

An improved apparatus for cooling a hot gas is provided. The apparatus (1) for cooling a hot gaseous medium includes a vessel (2), wherein a bundle (3) of a number of pipes (4) is disposed in a coolant medium compartment (5) and wherein, in use, a liquid coolant medium (6) flows around the pipe bundle (3). The pipes (4) are mounted at least at or near their upstream ends in a thermal shield (7). The pipes (4) further extend through openings in a support plate (8) mounted at a distance from the thermal shield (7) defining a front space (9) between the thermal shield (7) and the support plate (8) in the vessel (2) separated from the coolant medium compartment (5). The apparatus permits addition of liquid coolant to the front space (9). The openings (11) in the support plate (8) are larger than the pipes (4) defining an annular space (12) between pipe and support plate, which annular space (12) fluidly connects the front space (9) with the coolant medium compartment (5) such that, in use, liquid coolant can flow co-current with the hot gaseous medium in the pipes (4) from the front space (9) to the coolant medium compartment (5). A skirt type extension (13) is present around the pipe (4) in the front space (9) fixed to the support plate (8) and having an opening (14) at the thermal shield (7).

Applicants have found that the combination of the skirt and the co-current flow of the coolant medium along the upstream end of the pipes provides an improved cooling of the heat exchanger inlet section.

DETAILED DESCRIPTION OF THE DRAWINGS INVENTION

Figure 1:
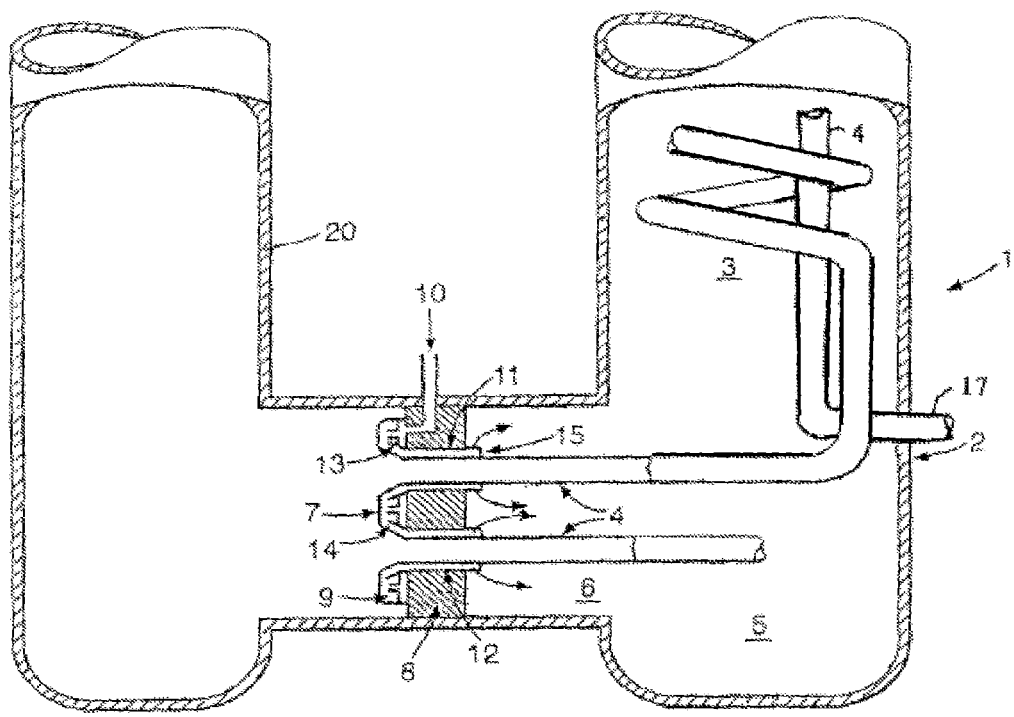
FIG. 1 represents schematically a sectional view of a heat exchanger of the invention connected to a reactor.

FIG. 1 illustrates part of the heat exchanger apparatus (1) according the invention for cooling a hot gaseous medium.

Also shown is the lower end of a partial oxidation or gasification reactor (20) in which a hot synthesis gas is produced which is suitably cooled by apparatus (1). The apparatus (1) comprises a vessel (2) wherein a bundle (3) of a number of pipes (4) are disposed in a coolant medium compartment (5). The number of pipes in the apparatus is suitably at least 4. The maximum number of pipes will be determined by the required cooling capacity per apparatus and can be up to and including 24, suitably between and including 6 and 20. The pipe bundle can be arranged as a set of straight parallel oriented pipes, wherein for example the at the gas outlet ends of the pipes are arranged in a second tube plate shield fluidly connected to a common gas outlet of the heat exchanger apparatus. Advantageously, for reasons of space saving helically coiled tubes are applied as shown in FIG. 1. FIG. 1 also shows a gas outlet end (17) of the pipes (4).

In use a liquid coolant medium (6) will flow freely around the pipe bundle (3). A suitable cooling medium is water. In use water will evaporate to produce steam. In the remainder of the description reference is made to water as the cooling medium. It is to be understood that instead water also other cooling media can be used in the below embodiments. The means to discharge steam at the top of the vessel (2) and optional means to add fresh coolant medium, preferably water, directly to the coolant medium compartment (5) as will present in the apparatus according to the invention are not shown in FIG. 1. It is however advantageous that substantially all of the water, suitably more than 90 wt % and preferably 100% of the fresh cooling water is provided to cooling medium compartment (5) via means (10), front space (9) and annular space (12).

In FIG. 1 it is shown that the pipes (4) are mounted at their upstream ends in a thermal shield (7). Just downstream in the direction of the hot gas flow the pipes (4) further extend through a support plate (8). The thermal shield (7) is mounted at a distance from the support plate (8) determining a front space (9) between said thermal shield (7) and said support plate (8) in the vessel (2). The support plate separates the front space (9) from the coolant medium compartment (5). This front space should be large enough for the water added by the means (10) to sufficiently cool the thermal shield and the upstream ends of the pipes. This space should however not be too large in order to avoid water to evaporate in this space. Examples of suitable dimensions are disclosed in the above referred to U.S. Pat. No. 5,671,807, U.S. Pat. No. 4,245,696 and EP-A-774103.

The thermal shield and support plate are preferably oriented vertically as shown in FIG. 1. This orientation allows for connecting the gasification reactor (20) and the heat exchanger apparatus (1) more efficiently. The efficiency is achieved in that the surface area, which requires refractory lining, is minimized.

Figure 2:
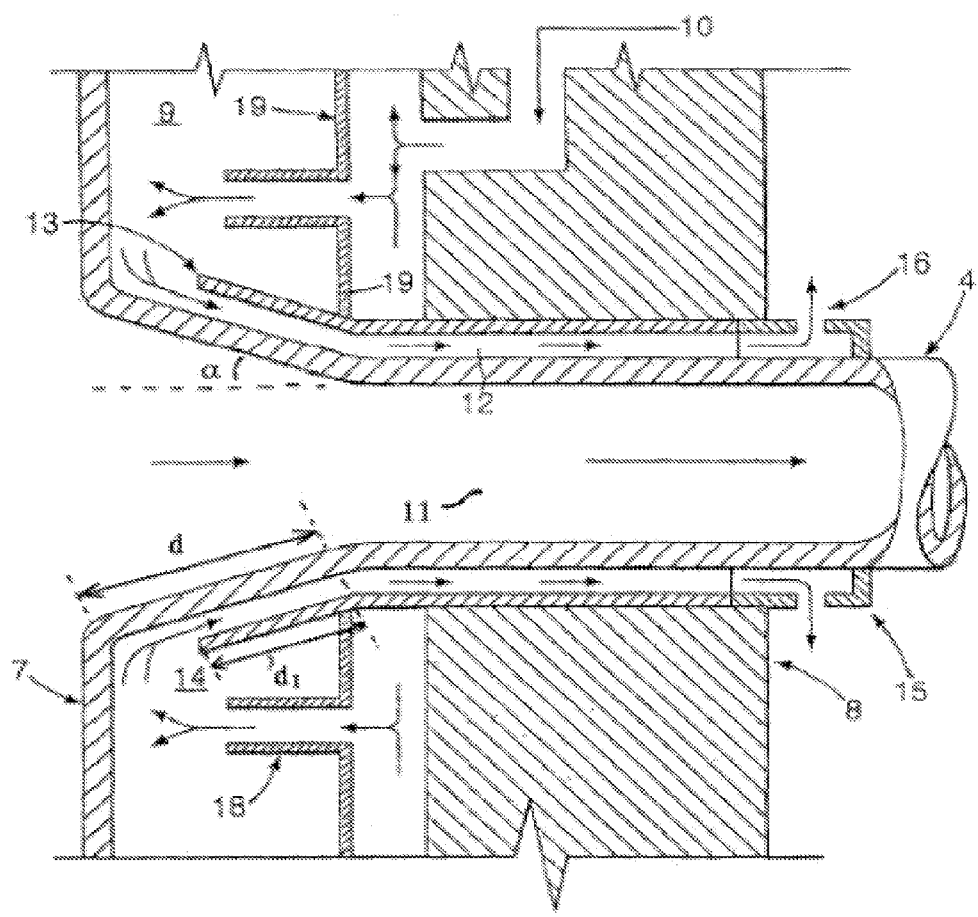
FIG. 2 is a detailed view of the cooled front of the heat exchanger of the present invention.

Reference is now made to FIG. 2, which shows a more detailed view of the inlet section of FIG. 1. By means (10) water is added to the front space (9). Preferably means (10) is a conduit for transport of water which runs from a water reservoir exterior to the vessel via the support plate (8) to a coolant medium distributor (19) which has multiple outlet openings in the front space (9). The outlet openings (18) are preferably distributed between the various pipe inlet openings with a preferred outlet flow direction towards the thermal shield to achieve optimal cooling of said plate. If the volume of water added by means (10) is, in use, not enough to compensate for the volume of water, which evaporates in the main coolant medium compartment (5) an additional means to add water to the main coolant compartment (5) is suitably present.

FIG. 2 shows that the openings (11) in the support plate (8) are larger than the pipes (4) defining an annular space (12) between pipe and support plate. Through this annular space (12) liquid coolant can flow co-current with the hot gaseous medium in the pipes (4) from the front space (9) to the cooling medium compartment (5). The co-current flow of coolant is advantageous because a more efficient cooling of the thermal shield (7) and the inlet end of the pipes (4) is achieved than when the coolant would flow counter-current as disclosed in EP-A-774103. The cooling of these critical parts is further enhanced by positioning the skirt type extension (13) around the pipe (4) in the front space (9). The skirt (13) is fixed to the support plate (8). The skirt type extension has an opening (14) for inlet of cooling medium. The opening (14) is preferably a full circular opening as shown in FIG. 2. To achieve the optimal cooling of said critical parts the opening (14) is at the thermal shield (7) as shown in FIG. 1. Advantageously the skirt is rotation-symmetrical, e.g. a sleeve as shown in FIG. 2.

The inlet opening of the pipes (4) at the thermal shield (7) are preferably conical shaped as shown in FIGS. 1 and 2. This means that the inner opening of the tube (4) when it passes the thermal shield (7) is greater than the inner opening of the tube (4) as it passes the support plate (8). The angle, alpha, between the inner inlet surface of the tube (4) of the frusto conical part of said tube and the axis of the tube is preferably smaller than 30°, more preferably between 5 and 25° and most preferably between 10 and 25°. The corner between the inner conical shaped surface of the tube (4) and the surface of the thermal shield is preferably smooth such to avoid turbulence of the hot gas passing that point. Applicants have found that such a design further avoids local high temperature metal surfaces at a point in the apparatus where such temperatures can be excessive. Preferably the shape of the skirt type extension (13) runs parallel with the shape of the inlet end of the pipes (4). Thus the shape of the skirt type extension will therefore preferably be composed of a tubular part fixed to a frusto conical part as shown in FIG. 2. More preferably the length of the conical shaped inlet is substantially the same as the depth of the front space. The skirt type extension (13) will then only have a frusto conical shape. Even more preferably the skirt extends a length d1 from the point where the skirt starts to expand in diameter. This length d1 is between 30 and 70% of the length d along the conical shaped inlet part as measured from the point in the tube where the conical part starts to expand in diameter. The length d is the total length of the conical part as measured along the surface of the tube and in the direction of the gas flow. Computer simulation has shown that such a preferred and the more preferred design achieve an optimal cooling effect on the thermal shield (7) and the inlet end of the pipes (4).

FIG. 2 also shows a spacer ring (15) to fix the pipe (4) in the support plate (8). The spacer ring (15) is provided with an opening (16) through which water flowing from the front space can flow to the coolant medium compartment (5). Said ring (15) may be positioned at any location in the annular space (12) as illustrated in U.S. Pat. No. 5,671,807 and U.S. Pat. No. 4,245,696. Preferably the spacer ring (15) is positioned in opening (11) at the side of the support plate (8) facing the coolant medium compartment (5). This location is advantageous because in case of overheating build up of steam in the annular space (12) is thus avoided because it can then more freely escape to the front space (9) from where it can be discharged via, for example, a thermo siphon system which is not shown in the Figure. This is a disadvantage of the design of U.S. Pat. No. 5,671,807 wherein steam can build up in the annular space because it cannot readily flow to the front space and exit the vessel via relieve valves which are for simplicity not shown in the Figures. It is clear that substantially all of the outer area of the tube (4) is in direct contact with the water in cooling medium compartment (5). With substantially all is here meant at least 90% of the outer surface area of the tubes (4).

Figure 3:
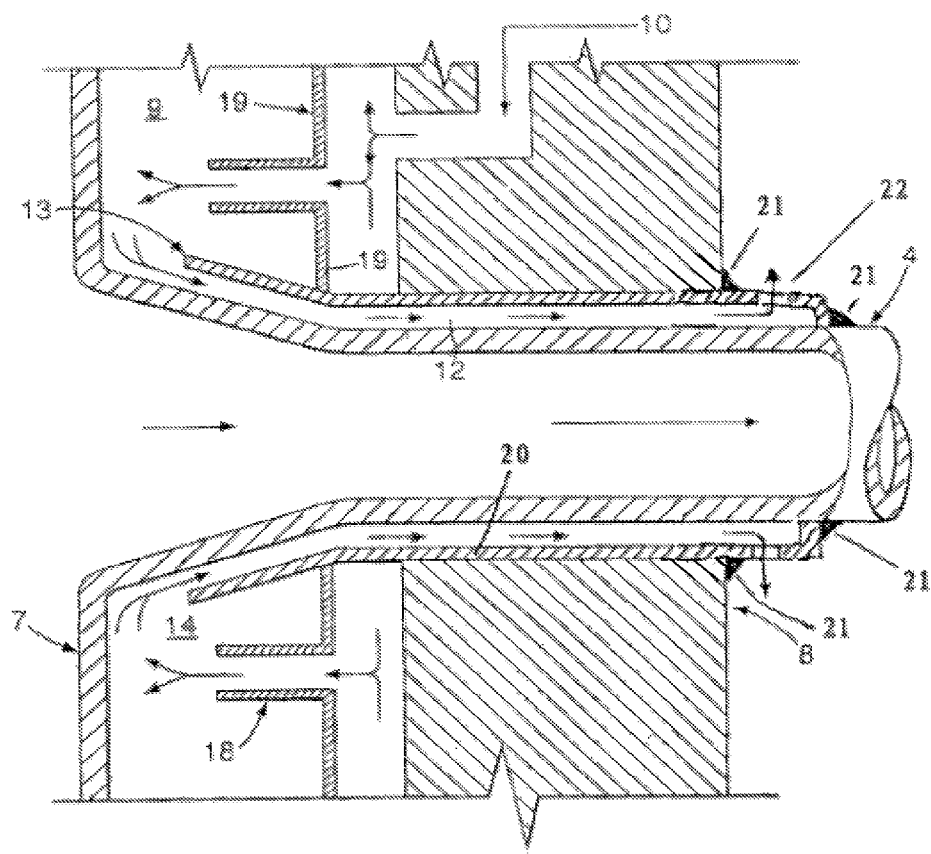
FIG. 3 is a detailed view of the cooled front of another embodiment of the heat exchanger of the present invention.

FIG. 3 is as FIG. 2. In this Figure a preferred embodiment the skirt extends through support plate (8) and eliminates the need for an additional support ring as in FIG. 2. This skirt type extension (20) is closed at its end facing the cooling medium compartment (5) except for one or more openings (22) for allowing water to flow from annular space (12) to the cooling medium compartment (5). Preferably this skirt type extension (20) fixes the tube (4) to the support plate (8) by means of welding (21) between the skirt type extension (20) and the support plate (8) and the skirt type extension (20) and the tube (4) as illustrated in FIG. 3.

The invention is also directed to the use of an apparatus as described above for cooling hot gasses having a temperature of between 700 and 1600° C., preferably between 1000 and 1600° C. against water as coolant medium to prepare steam having a pressure of up to 15 MPa.

That which is claimed is:

1. An apparatus for cooling a hot gaseous medium comprising: a vessel, wherein a bundle of a number of pipes is disposed in a coolant medium compartment and wherein, in use, a liquid coolant medium flows around the pipe bundle;
   (i) said pipes being mounted at least at or near their upstream ends in a thermal shield;
   (ii) said pipes further extend through openings in a support plate mounted at a distance from the thermal shield defining a front space between the thermal shield and the support plate in the vessel separated from the coolant medium compartment;
   (iii) means for adding liquid coolant to the front space;
   (iv) the openings in the support plate are larger than the pipes defining an annular space between pipe and support plate, which annular space fluidly connects the front space with the coolant medium compartment such that, in use, liquid coolant can flow co-current with the hot gaseous medium in the pipes from the front space to the coolant medium compartment;
   (v) wherein a skirt type extension is present around the pipe in the front space fixed to the support plate and having an opening at the thermal shield and wherein the inlet opening of the pipes at the thermal shield are conical shaped and wherein the skirt type extension extends between 30% and 70% of the length d along the conical shaped inlet part as measured from the point in the tube where the conical part starts to expand in diameter and wherein the length d represents the total length of the conical part as measured along the surface of the tube and in the direction of the gas flow.

2. The apparatus according to claim 1, wherein the pipes are fixed to the support plate via spacer rings, wherein the spacer rings are provided with openings fluidly connecting annular space with the coolant medium compartment.

3. The apparatus according to claim 2, wherein the rings are positioned in the openings at the side of the support plate facing the coolant medium compartment.

4. The apparatus according to claim 1, wherein the skirt type extension extends through support plate and is closed at its end facing the coolant medium compartment except for one or more openings for allowing cooling medium to flow from annular space to the coolant medium compartment.

5. The apparatus according to claim 4, wherein the skirt type extension fixes the tube to the support plate by means of welding between the skirt type extension and the support plate and the skirt type extension and the tube.

6. The apparatus according to claim 1, wherein the angle (alpha) between the inner inlet surface of the tube of the frusto conical part of said tube and the axis of the tube is smaller than 30.

7. The apparatus according to claim 1, wherein the number of tubes is between and including six and twenty-four.

\* \* \* \* \*